(12) United States Patent
Boutaghou et al.

(10) Patent No.: US 6,535,353 B2
(45) Date of Patent: *Mar. 18, 2003

(54) CAPPED POLYMERIC LOAD/UNLOAD PADS

(75) Inventors: Zine Eddine Boutaghou, Vadnais Heights, MN (US); Joel David Limmer, Bloomington, MN (US); Jorge Vicente Hanchi, Bloomington, MN (US); Lance Eugene Stover, Eden Prairie, MN (US)

(73) Assignee: Seagate Technology LLC, Scotts Valley, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/188,400

(22) Filed: Nov. 6, 1998

(65) Prior Publication Data

US 2001/0012176 A1 Aug. 9, 2001

Related U.S. Application Data

(60) Provisional application No. 60/078,906, filed on Mar. 20, 1998.

(51) Int. Cl.⁷ ............................. G11B 21/21; G11B 5/60
(52) U.S. Cl. ................................ 360/235.1; 360/236.3; 360/237
(58) Field of Search .......................... 360/235.1, 235.2, 360/235.3–235.8, 236.3–236.5, 237

(56) References Cited

U.S. PATENT DOCUMENTS

| 4,528,652 A | * | 7/1985 | Horner et al. ............... 367/162 |
| 4,819,113 A | * | 4/1989 | Kubota et al. ............... 360/126 |
| 4,905,111 A | * | 2/1990 | Tuma et al. ................. 360/126 |
| 4,910,621 A | * | 3/1990 | Matsuda et al. ............. 360/104 |
| 4,933,785 A |   | 6/1990 | Morehouse et al. ...... 360/78.04 |
| 5,034,837 A |   | 7/1991 | Schmitz ..................... 360/105 |

(List continued on next page.)

FOREIGN PATENT DOCUMENTS

| JP | 55-84021  | * | 6/1980 |
| JP | 2-173929  | * | 7/1990 |
| JP | 2-218078  | * | 8/1990 |
| JP | 3-191895  | * | 8/1991 |

*Primary Examiner*—Brian E. Miller (57) ABSTRACT

A disk drive system includes a base, a disk stack rotatably attached to the base, and an actuator assembly movably attached to the base. A ramp assembly includes a set of ramps for loading and unloading the sliders and transducing elements carried by the sliders to and from the disks in the disk stack. The ramp assembly is attached to the base. An actuator assembly is movably attached to the base of the disk drive. The actuator assembly moves the load springs and attached slider and transducers to various positions on the disk. The slider is a block of material having corners and edges. Sliders have a backside surface and an air-bearing surface. The slider also has at least one recess therein. One or more pads of shock absorbing material are positioned within at least one of the recesses in the slider. The pads are positioned within one or more recesses to prevent the corners or edges of the block of material near the air-bearing surface from contacting the disk. In one embodiment, the pads are positioned within the recesses so that the second material is positioned near the air-bearing surface. The pads include a first shock absorbing material, and a second material harder than the shock absorbing material. The second material can be diamond like carbon. After forming the pad, diamond like carbon is deposited on the pad using photolithography.

14 Claims, 7 Drawing Sheets

U.S. PATENT DOCUMENTS

| | | | | |
|---|---|---|---|---|
| 5,099,372 A | * | 3/1992 | Kadokura et al. | 360/99.01 |
| 5,198,934 A | * | 3/1993 | Kubo et al. | 360/104 |
| 5,200,867 A | * | 4/1993 | Albrecht et al. | 360/103 |
| 5,231,554 A | * | 7/1993 | Goto et al. | 360/103 |
| 5,235,482 A | | 8/1993 | Schmitz | 360/97.02 |
| 5,267,104 A | * | 11/1993 | Albrecht et al. | 360/97.02 |
| 5,270,888 A | * | 12/1993 | Collisson et al. | 360/103 |
| 5,285,337 A | * | 2/1994 | Best et al. | 360/234.1 |
| 5,455,723 A | | 10/1995 | Boutaghou et al. | 360/75 |
| 5,548,459 A | * | 8/1996 | Egawa et al. | 360/103 |
| 5,768,055 A | * | 6/1998 | Tian et al. | 360/103 |
| 5,774,303 A | * | 6/1998 | Teng et al. | 360/103 |
| 5,796,551 A | * | 8/1998 | Samuelson | 360/236.8 |
| 5,841,608 A | * | 11/1998 | Kasamatsu et al. | 360/103 |
| 5,864,452 A | * | 1/1999 | Hirano et al. | 360/122 |
| 5,903,969 A | * | 5/1999 | Haga | 29/603.18 |
| 5,936,799 A | * | 8/1999 | Kuratomi | 360/97.03 |
| 5,986,851 A | * | 11/1999 | Angelo et al. | 360/103 |
| 5,991,118 A | * | 11/1999 | Kasamatsu et al. | 360/103 |
| 6,040,958 A | * | 3/2000 | Yamamoto et al. | 360/235.6 |
| 6,137,656 A | * | 10/2000 | Levi et al. | 360/235.4 |
| 6,172,850 B1 | * | 1/2001 | Ishihara | 360/235.2 |
| 6,229,671 B1 | * | 5/2001 | Boutaghou et al. | 360/235.1 |
| 6,252,742 B1 | * | 6/2001 | Kameyama | 360/237 |
| 6,351,345 B1 | * | 2/2002 | Kameyama | 360/235.6 |
| 6,392,842 B1 | * | 5/2002 | Boutaghou et al. | 360/235.8 |

* cited by examiner

CAPPED POLYMERIC LOAD/UNLOAD PADS

RELATED APPLICATION

This application claims the benefits of U.S. Provisional Application Ser. No. 60/078,906, filed Mar. 20, 1998; U.S. Provisional Application Ser. No. 60/059,464, filed Sep. 22, 1997; and application Ser. No. 09/081,421 U.S. Pat. No. 6,229,671, filed May 19, 1998 under 35 U.S.C. 119(e).

This application claims the benefit of U.S. Provisional Application Serial Number 60/078,906, filed Mar. 20, 1998 under 35 U.S.C. 119(e).

FIELD OF THE INVENTION

The present invention relates to the field of mass storage devices. More particularly, this invention relates to a slider for use in a disk drive which includes a ramp for loading and unloading a transducing head to and from the disk.

BACKGROUND OF THE INVENTION

One of the key components of any computer system is a place to store data. Computer systems have many different places where data can be stored. One common place for storing massive amounts of data in a computer system is on a disk drive. The most basic parts of a disk drive are a disk that is rotated, an actuator that moves a transducer to various locations over the disk, and electrical circuitry that is used to write and read data to and from the disk. The disk drive also includes circuitry for encoding data so that it can be successfully retrieved and written to the disk surface. A microprocessor controls most of the operations of the disk drive as well as passing the data back to the requesting computer and taking data from a requesting computer for storing to the disk.

The transducer is typically housed within a small ceramic block. The small ceramic block is passed over the disk in a transducing relationship with the disk. The transducer can be used to read information representing data from the disk or write information representing data to the disk. When the disk is operating, the disk is usually spinning at relatively high RPM. These days common rotational speeds are 7200 RPM. Some rotational speeds are as high as 10,000 RPM. Higher rotational speeds are contemplated for the future. These high rotational speeds place the small ceramic block in high air speeds. The small ceramic block, also referred to as a slider, is usually aerodynamically designed so that it flies over the disk. The best performance of the disk drive results when the ceramic block is flown as closely to the surface of the disk as possible. Today's small ceramic block or slider is designed to fly on a very thin layer of gas or air. In operation, the distance between the small ceramic block and the disk is very small. Currently "fly" heights are about 12 microinches. In some disk drives, the ceramic block does not fly on a cushion of air but rather passes through a layer of lubricant on the disk.

Information representative of data is stored on the surface of the memory disk. Disk drive systems read and write information stored on tracks on memory disks. Transducers, in the form of read/write heads, located on both sides of the memory disk, read and write information on the memory disks when the transducers are accurately positioned over one of the designated tracks on the surface of the memory disk. The transducer is also said to be moved to a target track. As the memory disk spins and the read/write head is accurately positioned above a target track, the read/write head can store data onto a track by writing information representative of data onto the memory disk. Similarly, reading data on a memory disk is accomplished by positioning the read/write head above a target track and reading the stored material on the memory disk. To write on or read from different tracks, the read/write head is moved radially across the tracks to a selected target track. The data is divided or grouped together on the tracks. In some disk drives, the tracks are a multiplicity of concentric circular tracks. In other disk drives, a continuous spiral is one track on one side of a disk drive. Servo feedback information is used to accurately locate the transducer. The actuator assembly is moved to the required position and held very accurately during a read or write operation using the servo information.

Disk drives have actuator assemblies which are used to position the slider and transducer at desired positions with respect to the disk. The slider is attached to the arm of the actuator assembly. A cantilevered spring, known as a load spring, is typically attached to the actuator arm of a disk drive. The slider is attached to the other end of the load spring. A flexure is attached to the load spring and to the slider. The flexure allows the slider to pitch and roll so that the slider can accommodate various differences in tolerance and remain in close proximity to the disk. The slider has an air-bearing surface ("ABS") which includes rails and a cavity between the rails. The air-bearing surface is that portion of the slider that is nearest the disk as the disk drive is operating. When the disk rotates, air is dragged between the rails and the disk surface causing pressure, which forces the head away from the disk. At the same time, the air rushing past the depression in the air-bearing surface produces a negative pressure area at the depression. The negative pressure or suction counteracts the pressure produced at the rails. The different forces produced counteract and ultimately fly over the surface of the disk at a particular fly height. The fly height is the thickness of the air lubrication film or the distance between the disk surface and the head. This film eliminates the friction and resulting wear that would occur if the transducing head and disk were in mechanical contact during disk rotation.

One of the most critical times during the operation of a disk drive is just before the disk drive shuts down. The small ceramic block is typically flying over the disk at a very low height when shutdown occurs. In the past, the small block was moved to a non data area of the disk where it literally landed and skidded to a stop. Disk drives that park the slider on a non data area of the disks have problems. One of the problems is the result of using disks with a smooth surface within the disk drive. When the sliders are parked on the smooth surface of the disk, stiction results between the slider, a small ceramic block, and the disk surface. In some instances, the force due to stiction are large enough to virtually rip the slider away from the load spring. Other problems include the limited life of the disk drive. Each time the drive was turned off another start stop contact cycle would result. After many start stop contacts, the small ceramic block may chip or produce particles. The particles could eventually cause the disk drive to fail.

To overcome the problems associated with parking a slider on the disk, ramps where added to disk drives so that the sliders could be removed from the disk surface before landing. Adding ramps eliminates the problems of stiction and particle generation from landing the slider on the disk surface. In most designs, a ramp is placed on the edge of the disk. A portion of the ramp is positioned over the disk itself. The power down procedure includes moving the load springs and attached sliders to the ramp where a portion of the load spring or an attached tang rides up the ramp to controllably remove the slider or sliders from their respective disk surfaces. Of course, with the sliders or ceramic blocks positioned on the ramp, the sliders do not contact the disk. Commonly, this procedure is referred to as unloading the heads. Unloading the heads helps to insure that data on the disk is preserved since, at times, unwanted contact between the slider and the disk results in data loss on the disk. When a disk drive is started, the load springs and sliders are moved down the ramp to place the sliders over the disk surface. This procedure is commonly referred to as loading the heads onto the disk. Disk drives with ramps are well known in the art. U.S. Pat. No. 4,933,785 issued to Morehouse et al. is one such design. Other disk drive designs having ramps therein are shown in U.S. Pat. No. 5,455,723, U.S. Pat. No. 5,235,482, and U.S. Pat. No. 5,034,837.

As the load spring or tang rides up and down the ramp surface during a loading or unloading operation, the slider rotates on its longitudinal axis. Another way of saying this is that the slider will roll when it goes up or comes off of the ramp. Since the slider is located so closely to the disk, when the slider rolls during loading or unloading, many times the slider contacts the disk. When the slider contacts the disk, the disk or the slider may become damaged and expose the disk drive to an immediate or eventual head crash in which all or some of the data could be permanently lost.

Typically the corners or edges of the slider are the portion of the slider that contacts the disk during loading or unloading operations. In some disk drives, the corners of the slider are rounded or blended so that the damage produced by disk contact is minimized. There are several problems with this approach. The slider with blended or rounded edges does not absorb any shock. Although the force of the shock is dispersed over a larger area, contact between the disk and slider still occurs. The potential for loss of data and the potential head crash remains even though the corners and edges of the slider have been rounded or blended. Another drawback is that the flying characteristics are changed when the surfaces of the slider are blended or rounded. Blending or rounding of the edges and corners change the aerodynamics of the sliders. Blending adds many unknowns, for example, to the predictions used for fly height of the slider. In addition, blending or rounding also adds to the complexity of manufacture of the sliders.

As can be seen, there is a need for a slider that can absorb some of the impact that might occur when the slider contacts the disk during a loading or unloading operation. There is also a need for a solution which will not change the aerodynamics and is still relatively easy to manufacture. There is also a need for a solution which will not generate particles and put the disk drive at risk of a disk crash.

SUMMARY OF THE INVENTION

A disk drive system includes a base, a disk stack rotatably attached to the base, and an actuator assembly movably attached to the base. A ramp assembly includes a set of ramps for loading and unloading the sliders and transducing elements carried by the sliders to and from the disks in the disk stack. The ramp assembly is attached to the base. An actuator assembly is movably attached to the base of the disk drive. The actuator assembly includes one or more arms. A load spring is attached to the at least one arm of the actuator. In some instances two load springs are attached to the arm of the actuator. A slider is attached to the load spring. The slider includes a block of material having corners and edges. Sliders have a backside surface and an air-bearing surface. The slider has a recess therein.

A pad of shock absorbing material is positioned within the recess. A transducer element is attached to said slider. The pad is positioned within the recess of the slider to prevent contact with the corners or edges of the block of material with another surface, such as the disk. The block of material also may include a plurality of recesses therein. A plurality of pads of shock absorbing material are positioned within at least some of the recesses in the slider. The pads are positioned within said plurality of recesses to prevent the corners or edges of the block of material near the air-bearing surface from contacting another surface, such as the disk drive. The pads include a first shock absorbing material, and a second material harder than the shock absorbing material. In one embodiment, the pads are positioned within the recesses so that the second material is positioned near the air-bearing surface. The second material can be diamond like carbon. After forming the pad, diamond like carbon is deposited on the pad using photolithography.

Advantageously, the slider with the capped elastomeric pads can absorb some of the impact that might occur when the slider contacts the disk during a loading or unloading operation. Since the pads are placed in recesses on the slider the aerodynamics do not change appreciably. The same aerodynamic predictors can be used by designers. In addition the slider is still relatively easy to manufacture. In addition, the slider with capped polymeric pads will absorb some of the impact shock and will lessen the possibility of particle generation and will lessen the risk of a head crash in the disk drive, when compared to other previously tried solutions.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
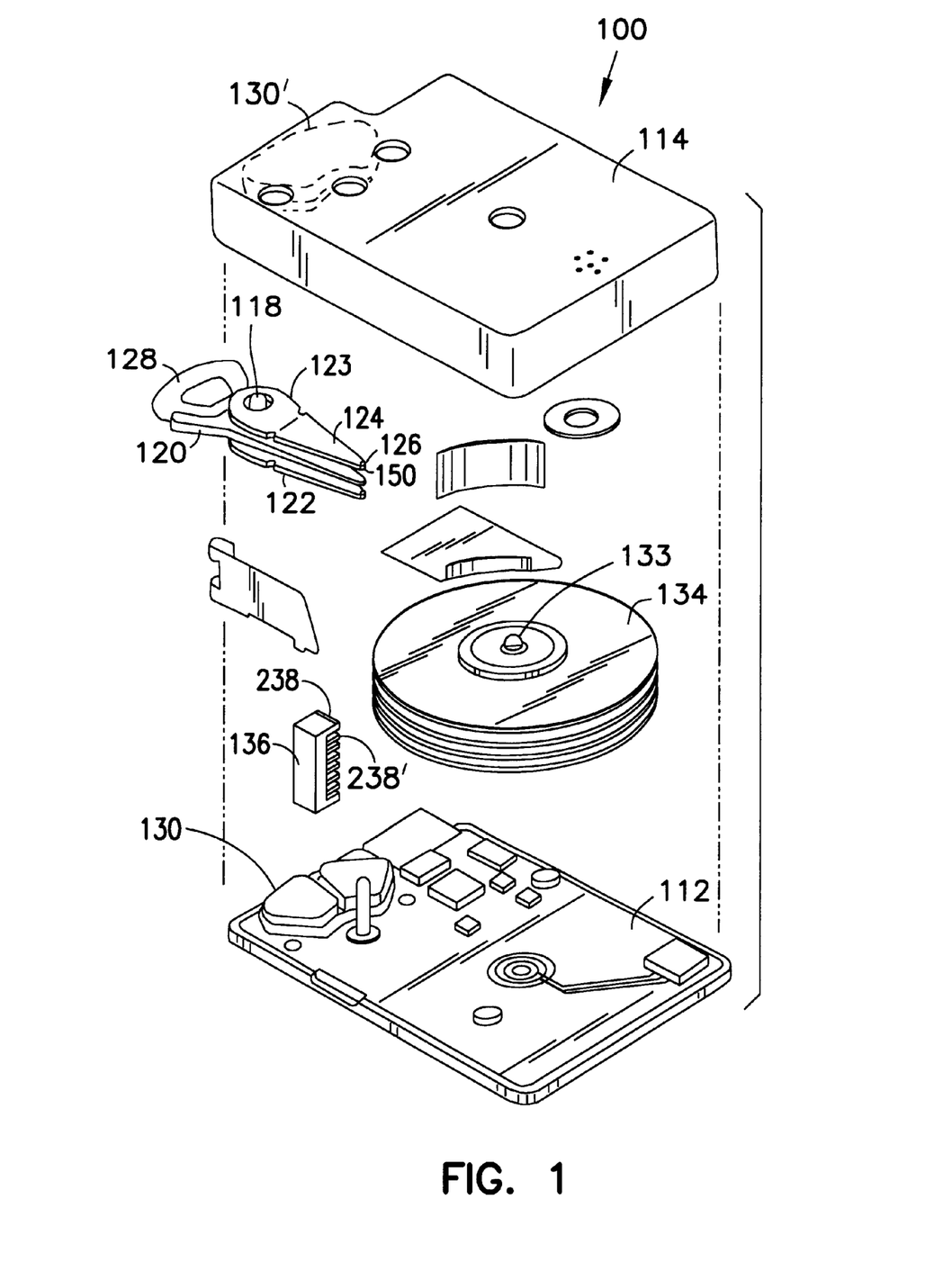
FIG. 1 is an exploded view of a disk drive with a multiple disk stack and a ramp assembly for loading and unloading transducers to and from the surfaces of the disks.

The invention described in this application is useful with all mechanical configurations of disk drives having either rotary or linear actuation. In addition, the invention is also useful in all types of disk drives including hard disk drives, zip drives, floppy disk drives and any other type of drives where unloading the transducer from a surface and parking the transducer may be desirable. FIG. 1 is an exploded view of one type of a disk drive 100 having a rotary actuator. The disk drive 100 includes a housing or base 112, and a cover 114. The base 112 and cover 114 form a disk enclosure. Rotatably attached to the base 112 on an actuator shaft 118 is an actuator assembly 120. The actuator assembly 120 includes a comblike structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. Also attached to the load spring is a load tang 152. The load tang 152 is used for loading sliders 126 to the disk 134 and unloading the sliders 126 from the disk. On the end of the actuator arm assembly 120 opposite the load springs 124 and the sliders 126 is a voice coil 128.

Attached within the base 112 is a pair of magnets 130 and 130'. The pair of magnets 130 and 130', and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disk drive, the spindle motor is within the hub. In FIG. 1, a number of disks 134 are attached to the spindle hub 133. In other disk drives a single disk or a different number of disks may be attached to the hub. The invention described herein is equally applicable to such other disk drives.

Figure 2:
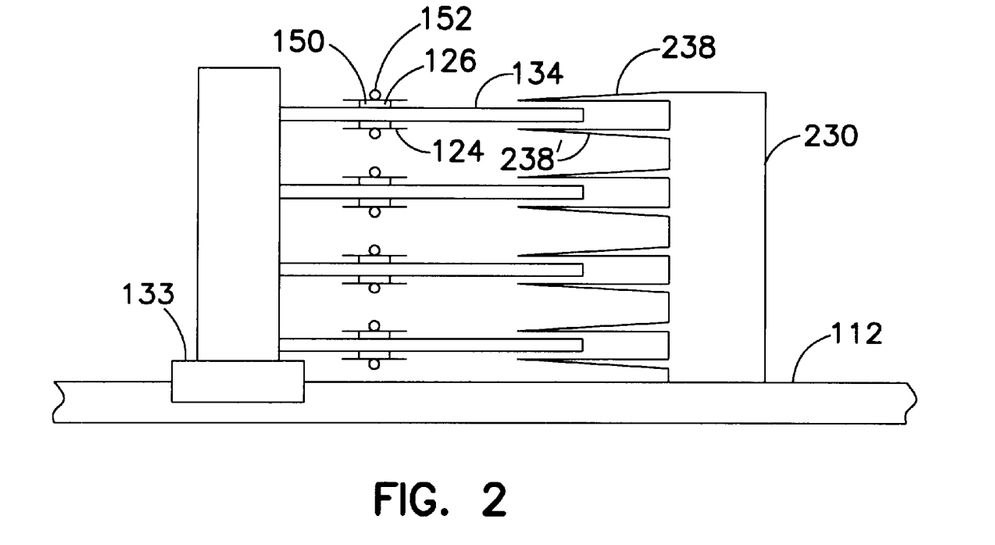
FIG. 2 is a side view of a disk drive having a ramp structure.

Also attached to the base 112 is a ramp structure 136. FIG. 2 is a side view of a disk drive having a ramp structure. Now looking at FIG. 2, the ramp structure will be described in more detail. The ramp structure 136 has a plurality of individual ramps 238 and 238'. One ramp is associated with each surface of the disk. As shown, there is a ramp portion 238 for the top surface of a disk and a ramp 238' for a bottom surface of the disk 134. The ramp portion 238 is for the loading and unloading the transducer from the top surface of a disk 134 and the ramp portion 238' is for loading and unloading a transducer from the bottom surface of a disk 134. The disk drive shown in FIG. 2 has four disks. Each disk 134 has two surfaces so there are a total of eight disk surfaces within the disk drive shown. Only one disk and set of ramps 238 and 238' are labeled. The other disks and ramps are similar to the labeled disk 134 and set of ramps 238 and 238'. The ramp structure 136 shown in FIG. 2 is fixed to the base of the disk drive. The ramp structure can be formed as one unitary part or can be assembled from a number of different parts. For example, the ramp structure 134 shown could be comprised of four parts. Each part would include a set of ramps 238 and 238' and a main body 230 to which the ramps 238 and 238' are attached. A portion of each of the ramp portions 238 and 238' of the ramp is positioned over the disk 134. It should be noted that this invention could also be used on ramps that rotate in and out of a load/unload position.

Also shown in FIG. 2 are the load springs 124, which are referred to by some as load beams or suspensions, and the attached load tangs 152. The load tangs 152 are attached to the load springs 124. The slider 124 and transducer 150 carried by the slider are not illustrated in FIG. 2 for the sake of clarity. All the load springs 124 and tangs 152 are attached to the actuator. Moving the actuator assembly 120 moves all the load springs 124 and load tangs 152. In operation, the actuator assembly 120 is moved to a park position when the disk drive is powered down. Moving the actuator to the park position causes the load tangs 152 associated with each load spring 124 to ride up the ramp 238 or 238' associated with the surface of the disk 134. This is referred to as unloading the disk. When the disk drive is powered on, the actuator moves to an operating position by moving the load springs 124, load tangs 152, sliders and transducers off their respective ramps 238 or 238' into a transducing position over the surface of the disk 134. This is referred to as loading the disk. The load springs 124, load tangs 152 sliders 124 and transducers 150 of the disk drive are shown in a transducing position in FIG. 2. It should be noted that much of the actuator assembly 120 has been eliminated from FIG. 2 for the sake of clarity.

Figure 3:
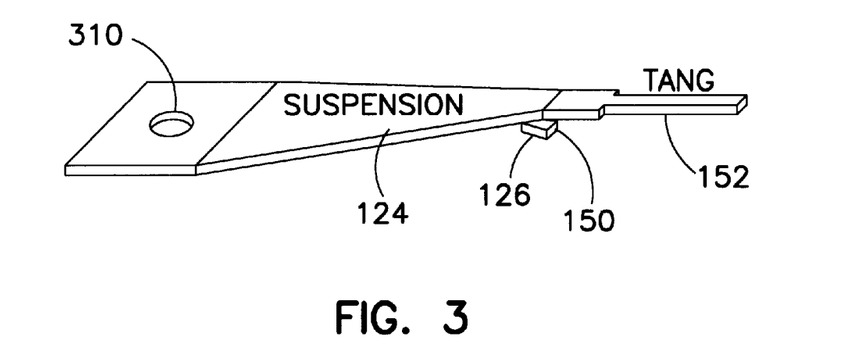
FIG. 3 is a perspective view of a load beam and load tang.

FIG. 3 is a perspective view of a load spring 124 and tang 152. The load spring 124 is a triangular structure which acts as a cantilevered spring to place a small load onto the slider 126 when the slider 126 is in transducing relationship with the disk 134. The load spring 124 is attached at its wider end to an actuator arm 123. The load spring 124 shown in FIG. 3 has a swage opening 310 and a swage plate 312 in the wider end. The swage opening 310 and swage plate 312 are used to attach the load spring 124 by a process referred to as swaging. Other attachment methods may also be used without departing from the spirit of this invention. The tang 152 is attached to a free end 320 of the load spring 124. The tang 152 is shown as an elongated cylinder. Also attached to the load spring 124 is the slider 126. The transducer 150 is carried by or within the slider 126. The tang 152 includes a gimbal dimple 600.

Figure 4:
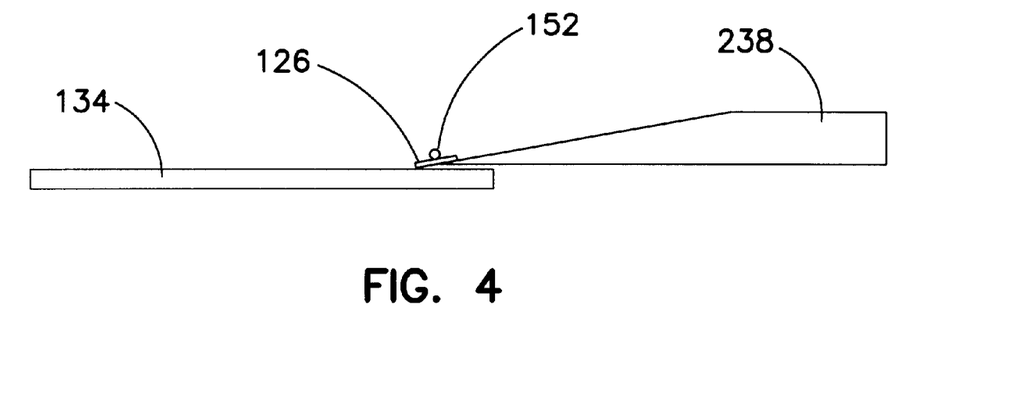
FIG. 4 is a end view of a slider on the tip of the ramp structure.

FIG. 4 is an end view of the slider 126 at the tip of the ramp structure 238. This is the position of the slider 126 either during loading of the slider 126 from the ramp 238 onto the disk or during unloading of the slider from the disk 134. During unloading, the slider 126 is removed from the surface of the disk 134 and parked on the ramp 238. As can be seen, the slider tilts or rolls either during loading or unloading of the slider when a ramp is used.

Figure 5:
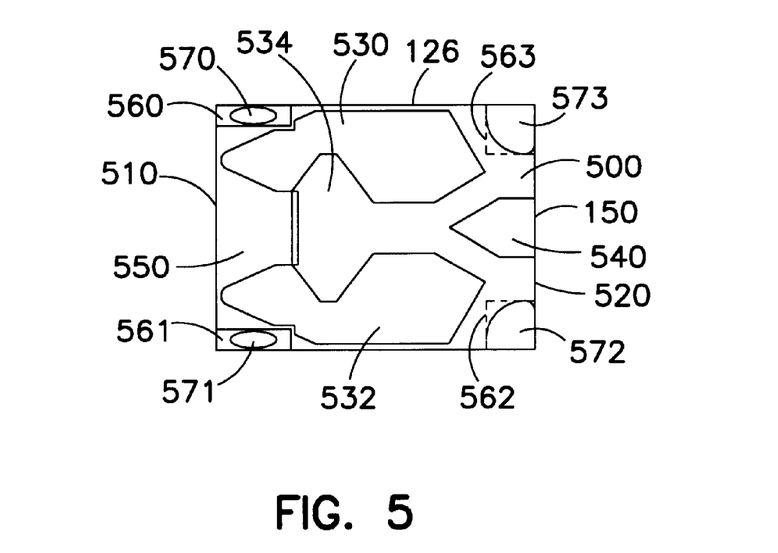
FIG. 5 is a bottom view of the slider which shows the air-bearing surface.

FIG. 5 is a bottom view of a slider 126. The slider 126 includes an air-bearing surface 500, a leading edge 510 and a trailing edge 520. The air-bearing surface 500 is the portion of the slider 126 which is most close to the disk 134, while the slider 126 is in transducing position. The bottom view shown in FIG. 5 of the slider 126 shows the air-bearing surface 500. The air-bearing surface 500 includes a first side rail 530, a second side rail 532 and a center pad or center island 540. The transducing head 540 is positioned near the trailing edge 520 and in the center island 540. The air-bearing surface 500 also includes a tapered leading edge 550. A cavity 534 is formed between the tapered leading edge 550, the first side rail 530, and the second side rail 532.

A series of recesses 560, 561, 562 and 563 are formed in the slider 126. The recesses generally occur at the corners of the slider 126 as shown in FIG. 5. Within each of the recesses is a shock-absorbing pad 570, 571, 572 and 573. The pads include a first elastomeric material or polymeric material that is used to absorb shock when the slider 126 contacts the disk 134. As will be discussed and shown in FIGS. 6 and 7, the pads 570, 571, 572 and 573 are capped with a second harder material.

It should be noted that although four recesses 560, 561, 562 and 563 are shown in this particular embodiment for a particular design, not all four pads 560, 561, 562 and 563 may be required. For example, the two front pads 571 and 572, which are situated near the leading edge 510 of the slider 126 may suffice for operating shock improvements. In other designs, the two back pads 572 and 573, which are positioned near the trailing edge 520 of the slider 126, may suffice for operating shock improvements. In addition, the back pads 572 and 573 may have a different elevation than the front pads 570 and 571. The back pads 572 and 573 can be made with an elevation that is just slightly lower than the air-bearing surface 500 to add roll stiffness to the air bearing. The back pads may be recessed from 1 to 3 microinches from the plane defined by the center island 540. In this way, the pads will not affect takeoff velocity. However, they will still improve the roll stiffness of the slider 126. The front pads can extend slightly above portions of the air-bearing surface 500.

Figure 6:
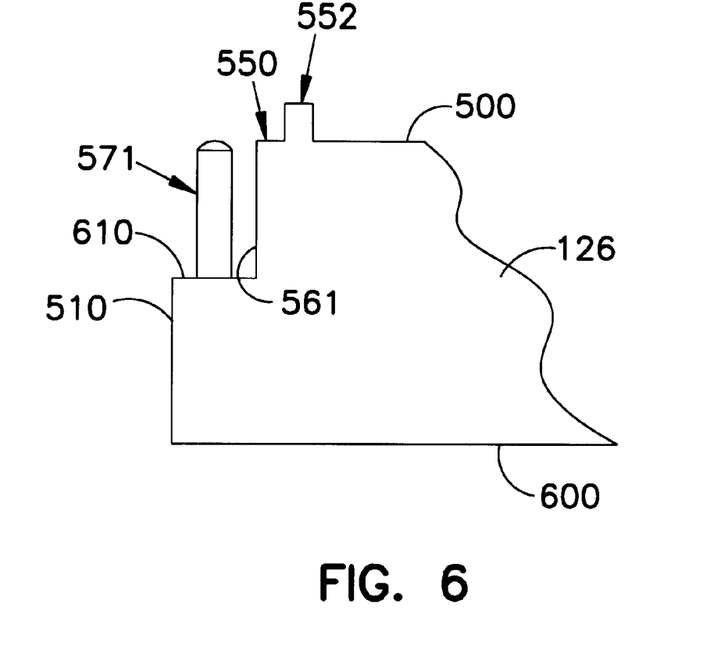
FIG. 6 is a cutaway side view of the slider showing a recess.
Figure 7:
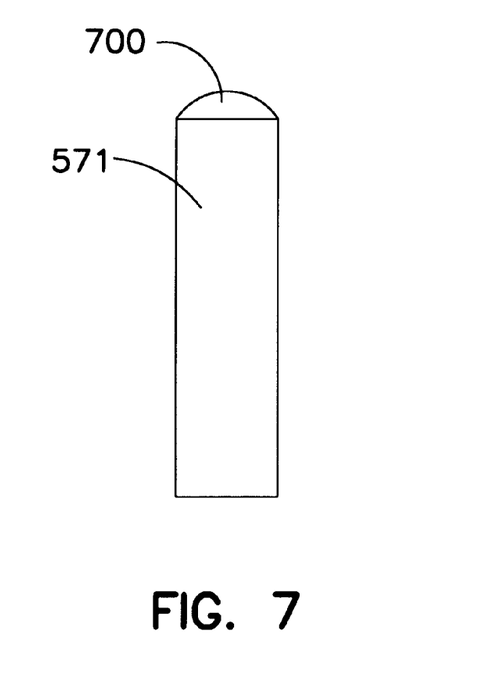
FIG. 7 is a side view of a pad for fitting into the recess of a slider the slider

FIGS. 6 and 7 show one recess 561 and one pad 571. FIG. 6 is a cutaway side view of the slider 126 showing a recess 561 and a pad 571. The portion of the slider 126 shown includes the leading edge 510 and the air-bearing surface 500. Also shown is the leading taper 550 and a rail leading edge 552. The slider 126 also shows a back side surface 600. The recess 561 is positioned on a corner of the slider 126. It should be noted that in this particular design the recesses and pads are near the corners of the slider 126. The recess 561 terminates before it reaches the back side surface 600. In other words, a ledge 610 is formed between the back side surface 600 and the air-bearing surface 500. The shock-absorbing pad 571 sits or is attached to the ledge 610. It should be understood that the recesses and pads that are populating the recesses need not be at the corners of the slider 126. The main design factor is that the recesses and pads that populate them be placed so that the corners and the edges of the slider 126 are prevented from contacting the disk 134 when the slider 126 rolls as it comes down the ramp during a load operation or as it goes up the ramp during an unloading operation.

FIG. 7 is a side view of one of the pads 571 which fits into one of the recesses 560, 561, 562 or 563. It should be noted that the pads 571, 572, 573 and 570 need not necessarily be of the same size. Generally, however, the front pads 570 and 571 are the same size. The back pads 572 and 573 are also generally the same size. The shock-absorbing pad 571 also includes a cap 700 of a material which is harder than the polymeric pad. The cap 700 on the polymeric shock pad shown 571 is diamond-like carbon. Diamond-like carbon enhances the tribological performance and eases the introduction of the slider 126 to the disk during load and unload operations. Of course it should be understand that the overcoat or cap 700 could include other materials such as silicon, diamond, various metals and TiC, as well as similar materials. The cap 700 is generally made of a material which is harder than the polymeric material for the shock-absorbing pad.

Figure 8:
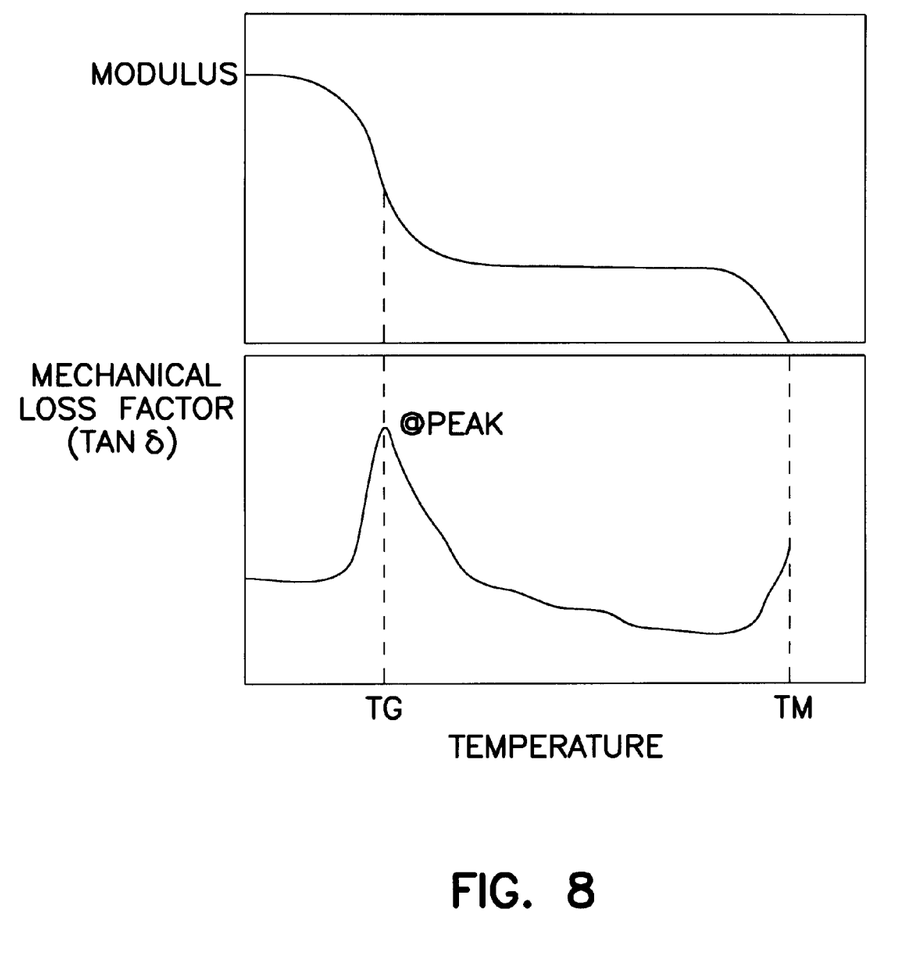
FIG. 8 is a set of two charts showing the Modulus and the Mechanical Loss Factor as a function of temperature for semicrystalline polymer.

A polymeric material suitable for application as shock load/unload pads would be a semicrystalline one with a glass transition temperature (Tg) within the range of normal drive operating temperatures. In effect, at the Tg the amorphous regions of a semicrystalline polymer undergo a major relaxation, namely the transition from "glassy" (T<Tg) to the "rubbery" (T>Tg) state. Coupled to the glass-to-rubber transition is an enhanced ability to dissipate mechanical energy, which derives from the fact that at and above the Tg, long-range molecular motions become possible within the amorphous regions of the polymer. A measure of such ability, it should be noted, is the magnitude (height) of the α-peak of the mechanical loss factor or "tan δ" as shown in FIG. 8. The magnitude of the α-peak is also a direct measure of the fraction of amorphous material present in a semicrystalline polymer. In other words, the larger the latter fraction is, the larger the magnitude of the α-peak. It is of interest to point out here that it is possible to shift the Tg to higher temperatures by increasing the degree of crystallinity. The latter phenomenon is linked to the fact that as the fraction of crystalline domains in a semicrystalline polymer increases, long-range thermally activated molecular motions within the amorphous regions are effectively constrained.

For enhanced overall performance, the degree of crystallinity of the polymer chosen as base material for the shock load/unload pads should be such that an optimum balance between energy-dissipative characteristics and mechanical properties is achieved. In fact, notice that, as shown schematically in FIG. 3, the onset of the glass-to-rubber transition is also accompanied by a deterioration of mechanical properties (elastic modulus, yield strength, etc.). In semicrystalline polymers such deterioration is more pronounced as the fraction of amorphous material increases. A good mechanical property profile, it should be noted, is key to ensuring the mechanical integrity of the pads in question over the expected service life of a slider.

A polymeric material with promising potential as base material for shock load/unload pads is Parylene available from Specialty Coatings Systems, Inc. of Indianapolis, Ind. This highly crystalline polymer has a glass transition temperature (Tg) of 13° C. and a melting point (Tm) of 290–420° C. Parylene can be deposited (via vapor phase deposition), as a structurally continuous film with thicknesses ranging from a fraction of a micrometer to several mils, on various types of substrates including semiconductors (e.g., silicon).

Figure 9:
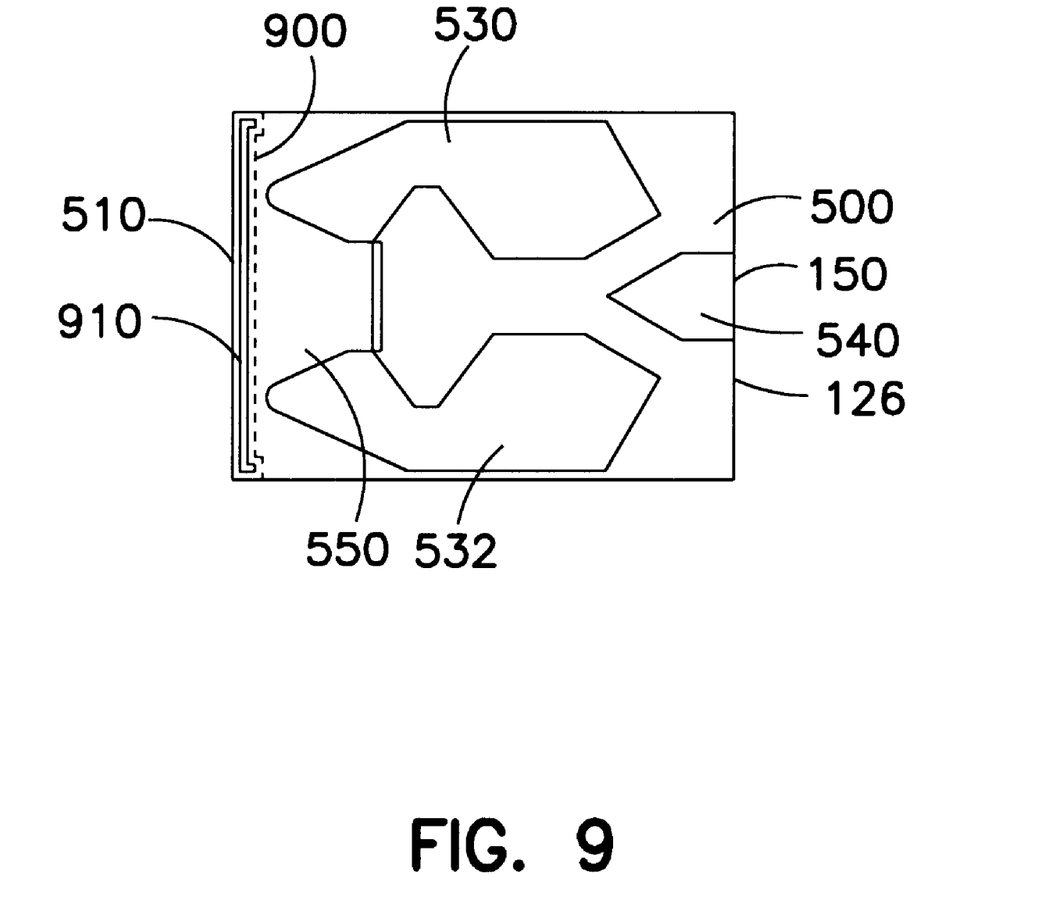
FIG. 9 is a bottom view of another embodiment of the slider.

FIG. 9 shows the air-bearing surface of another slider 126 which includes a different embodiment of the elastomeric pad. In this particular instance, the leading edge 510 of the slider 126 includes a similar recess which goes all the way across the front of the air-bearing surface 500. There is a recess 900 on the leading edge 510 of the slider 126. An elastomeric pad 910 fits within the recess 900. It should be noted that the recess 900 can be relatively shallow and that the pad 910 could be deposited in the recess 900. It is further contemplated that a recess may not be needed at all and that a pad could be deposited near the leading edge 510 using photolithography. The pad 900 could have an elastomeric or polymeric base. A final layer of photolithography could be used to attach a cap of harder material to the base of the shock-absorbing material of the pad 900.

Advantageously, the slider with the capped elastomeric pads can absorb some of the impact that might occur when the slider contacts the disk during a loading or unloading operation. Since the pads are placed in recesses on the slider the aerodynamics do not change appreciably. The same aerodynamic predictors can be used by designers. In addition the slider is still relatively easy to manufacture. In addition, the slider with capped polymeric pads will absorb some of the impact shock and will lessen the possibility of particle generation and will lessen the risk of a head crash in the disk drive, when compared to other previously tried solutions.

Figure 10:
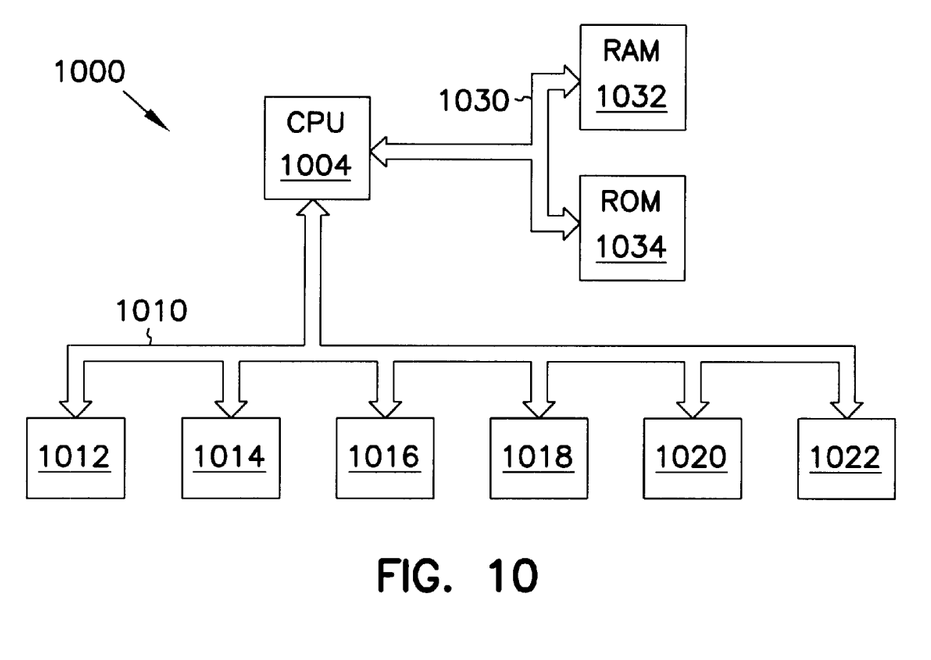
FIG. 10 is a schematic view of a computer system.

FIG. 10 is a schematic view of a computer system. Advantageously, the invention is well-suited for use in a computer system 1000. The computer system 1000 may also be called an electronic system or an information handling system and includes a central processing unit, a memory and a system bus. The information handling system includes a central processing unit 1004, a random access memory 1032, and a system bus 1030 for communicatively coupling the central processing unit 1004 and the random access memory 1032. The information handling system 1002 includes a disk drive device which includes the ramp described above. The information handling system 1002 may also include an input/output bus 1010 and several devices peripheral devices, such as 1012, 1014, 1016, 1018, 1020, and 1022 may be attached to the input output bus 1010. Peripheral devices may include hard disk drives, magneto optical drives, floppy disk drives, monitors, keyboards and other such peripherals. Any type of disk drive may use the slider having an opening therein for releasing the negative pressure produced by an air-bearing surface.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A head gimbal assembly for a disk drive comprising:
   a load spring; and
   a slider attached to the load spring, said slider further comprising:
   a block of material having corners and edges and having a plurality of surfaces including an air-bearing surface, said slider having a plurality of recesses positioned near the corners and edges of the block of material associated with the air-bearing surface; and
   a plurality of pads positioned within at least some of the plurality of recesses toward the air-bearing surface, said plurality of pads further comprising an elastomeric polymer and a cap of hard material wherein the cap is a diamond like carbon.

2. The head gimbal assembly of claim 1 wherein the cap of hard material is positioned near the air-bearing surface of the slider.

3. A slider for a disk drive comprising:
   a block of material having corners and edges, and having a plurality of surfaces including an air-bearing surface, said slider having a plurality of recesses positioned near the corners and edges of the block of material associated with the air-bearing surface; and
   a plurality of pads positioned within at least some of the plurality of recesses toward the air-bearing surface, the plurality of pads disposed toward the air-bearing surface, said plurality of pads comprising an elastomeric polymer having a cap made of a material harder than said elastomeric polymer.

4. The slider of claim 3 wherein the cap of a second material harder than the shock absorbing material is diamond like carbon.

5. A slider for a magnetic disk drive comprising:
   a block having a leading and trailing edge, said block also includes an air-bearing surface; and
   a shock absorbing member attached to the block, the shock absorbing member positioned with respect to the block to prevent contact between the air-bearing surface of the block and another surface, wherein said shock absorbing member includes an elastomeric pad and a cap comprising a material harder than said elastomeric pad.

6. The slider for a magnetic disk drive of claim 5 wherein the block of material includes edges and corners and wherein the shock absorbing member is positioned to prevent the corners or edges of the air-bearing surface of the block of material from contacting a surface.

7. The slider for a magnetic disk drive of claim 5 wherein the block of material includes edges and corners and wherein the block of material has recesses therein positioned near the corners of the block of material, the shock absorbing member positioned in the recesses in the block of material.

8. The slider according to claim 5, wherein said shock absorbing member is positioned adjacent a leading edge of said block.

9. The slider according to claim 5, wherein said shock absorbing member is positioned adjacent a trailing edge of said block.

10. A slider for a magnetic disc drive comprising
    a block having an air bearing surface, a leading edge and a trailing edge;
    first and second recesses formed within the air bearing surface of the block, said first recess proximate said leading edge and said second recess proximate said trailing edge; and
    shock absorbing members positioned within each of said first and second recesses and extending from the first and second recesses above a planar surface of said air bearing surface.

11. The slider in accordance with claim 10, wherein the shock absorbing members have a body and a cap, said body comprised of an elastomeric polymer and said cap comprised of a diamond like carbon.

12. The slider in accordance with claim 10, wherein said shock absorbing members are formed at least in part of a cylindrical shape.

13. The slider according to claim 10, wherein at least one of said shock absorbing members is positioned adjacent the leading edge of said block.

14. The slider according to claim 10, wherein at least one of said shock absorbing members is positioned adjacent a trailing edge of said block.

* * * * *